United States Patent
Yamashita

(10) Patent No.: US 11,979,357 B2
(45) Date of Patent: May 7, 2024

(54) WIRELESS COMMUNICATION SYSTEM, APPARATUS, AND METHOD TO REDUCE INTERFERENCE SIGNALS SUPERIMPOSED ON TRANSMISSION SIGNALS

(71) Applicant: NIPPON TELEGRAPH AND TELEPHONE CORPORATION, Tokyo (JP)

(72) Inventor: Fumihiro Yamashita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 352 days.

(21) Appl. No.: 17/432,050

(22) PCT Filed: Feb. 12, 2020

(86) PCT No.: PCT/JP2020/005301
§ 371 (c)(1),
(2) Date: Aug. 18, 2021

(87) PCT Pub. No.: WO2020/170905
PCT Pub. Date: Aug. 27, 2020

(65) Prior Publication Data
US 2022/0190996 A1    Jun. 16, 2022

(30) Foreign Application Priority Data
Feb. 20, 2019   (JP) ................ 2019-028836

(51) Int. Cl.
H04L 5/00     (2006.01)
H04W 56/00    (2009.01)

(52) U.S. Cl.
CPC ............ *H04L 5/0092* (2013.01); *H04L 5/006* (2013.01); *H04W 56/0035* (2013.01)

(58) Field of Classification Search
CPC ... H04B 5/0043; H04B 5/0081; H04L 5/0092; H04L 5/006; H04L 5/00; H04L 27/26;
(Continued)

(56) References Cited

U.S. PATENT DOCUMENTS

| | | | |
|---|---|---|---|
| 2010/0246387 A1* | 9/2010 | Krishnan | ............ H04L 12/4641 370/225 |
| 2019/0173652 A1* | 6/2019 | Fehrenbach | ........ H04L 27/0014 |
| 2022/0190996 A1* | 6/2022 | Yamashita | .............. H04L 27/26 |

FOREIGN PATENT DOCUMENTS

JP    2009008452    *  1/2009

OTHER PUBLICATIONS

Jun-ichi Abe et al. "Direct Spectrum Division Transmission Adapter for Satellite Communications", 34th AIAA International Communications Satelite Systems Conference (ICSSC 2016), AIA 2016, pp. 1-8.

(Continued)

*Primary Examiner* — Angelica Perez
(74) *Attorney, Agent, or Firm* — Harness, Dickey & Pierce, P.L.C.

(57) ABSTRACT

A reception apparatus includes: an interference estimation unit configured to estimate a frequency band of an interference signal in a reception signal on which the interference signal having a narrower frequency band than that of a transmission signal transmitted by a transmission apparatus is superimposed; a feedback unit configured to feed back the frequency band of the interference signal estimated by the interference estimation unit to the transmission apparatus; and a band synthesis unit configured to synthesize a plurality of sub-spectra in a frequency band corresponding to a plurality of sub-spectra decomposed by the transmission apparatus, and a transmission apparatus includes: a band division control unit configured to perform control for determining a band in which a transmission signal is divided (Continued)

based on the frequency band of the interference signal fed back from the reception apparatus; and a band division unit configured to band-divide the transmission signal into a plurality of sub-spectra so that the interference signal and the sub-spectra is partially superimposed, based on the band determined by the band division control unit.

8 Claims, 12 Drawing Sheets

(58) Field of Classification Search
CPC ........... H04W 56/0035; H04J 11/00663; H04J 11/0023
See application file for complete search history.

(56) References Cited

OTHER PUBLICATIONS

Jun-ichi Abe et al. "Proposal of Blind Frequency Synchronization Method for Direct Spectrum Division Adapter for Spectrum Decomposition Adapters", 2012 IEICE Communication Society Conference Correspondence Lecture Proceedings, p. 268.

* cited by examiner

WIRELESS COMMUNICATION SYSTEM, APPARATUS, AND METHOD TO REDUCE INTERFERENCE SIGNALS SUPERIMPOSED ON TRANSMISSION SIGNALS

CROSS-REFERENCE TO RELATED APPLICATIONS

This application is a 371 U.S. National Phase of International Application No. PCT/JP2020/005301 filed on Feb. 12, 2020, which claims priority to Japanese Application No. 2019-028836 filed on Feb. 20, 2019. The entire disclosures of the above applications are incorporated herein by reference.

TECHNICAL FIELD

The present invention relates to a wireless communication system, a transmission apparatus, and a wireless communication method.

BACKGROUND ART

FIG. 5 illustrates a spectrum in a case where an interference signal is superimposed on a transmission signal in satellite communication. FIG. 5(a) illustrates a spectrum of the interference signal. FIG. 5(b) illustrates a spectrum of the transmission signal. FIG. 5(c) illustrates a spectrum of a reception signal. As illustrated in FIG. 5, in a reception signal, an interference signal having a narrower frequency band than that of a transmission signal may be superimposed on the transmission signal.

FIG. 6 illustrates a spectrum when a first interference avoidance technique is used. FIG. 6(a) illustrates a spectrum of an interference signal. FIG. 6(b) illustrates a spectrum of a transmission signal. FIG. 6(c) illustrates a spectrum of a reception signal. As illustrated in FIG. 6, for example, when an interference factor cannot be identified on a satellite operator side, a user usually shifts a frequency of a transmission signal so that an interference signal and the transmission signal are not superimposed (hereinafter referred to as a "first technology").

FIG. 7 illustrates a spectrum when a second interference avoidance technology is used. FIG. 7(a) illustrates a spectrum of an interference signal. FIG. 7(b) illustrates a spectrum of a transmission signal. FIG. 7(c) illustrates a spectrum of a reception signal. As illustrated in FIG. 7, when a signal can be transmitted in a multi-carrier scheme or with multi-spectrum, there is also a method of dividing a transmission signal into a plurality of signals so as to avoid an interference signal and transmitting the divided signals, as described in Non Patent Literatures 1 and 2 (hereinafter, referred to as a "second technology").

FIG. 8 illustrates an overview of a wireless communication system 10 provided with a band decomposition synthesis function that implements the second technology. The wireless communication system 10 includes, for example, a signal transmission apparatus (transmission apparatus) 20 and a signal reception apparatus (reception apparatus) 30, and performs wireless communication in a communication environment in which an interference signal having a narrower frequency band than that of a transmission signal is superimposed on the transmission signal.

The signal reception apparatus 30 includes an interference estimation unit 300, a feedback unit 302, a frequency error detection unit 304, a frequency error control unit 306, and a band synthesis unit 308.

The interference estimation unit 300 estimates and identifies a frequency band of an interference signal (interference signal band) in a reception signal received by the signal reception apparatus 30.

The feedback unit 302 feeds back reception signal information including interference signal band information indicating the interference signal band estimated by the interference estimation unit 300 to the signal transmission apparatus 20.

The frequency error detection unit 304 detects a frequency error from a plurality of received sub-spectra included in the reception signal, and outputs frequency error information to the frequency error control unit 306.

The frequency error control unit 306 removes the frequency error of the plurality of received sub-spectra included in the reception signal, based on the frequency error detected by the frequency error detection unit 304.

The band synthesis unit 308 synthesizes the plurality of received sub-spectra from which the frequency error control unit 306 has removed the frequency error and outputs the synthesized spectrum.

The signal transmission apparatus 20 includes a band division control unit 200 and a band division unit 202.

The band division control unit 200 performs control for determining a band in which a transmission signal is divided, based on the reception signal information fed back from the signal reception apparatus 30.

The band division unit 202 band-divides the transmission signal into a plurality of sub-spectra based on the band determined by the band division control unit 200.

FIG. 9 illustrates a principle of operation of the wireless communication system 10 illustrated in FIG. 8. FIG. 9(a) illustrates a spectrum of an interference signal. FIG. 9(b) illustrates band division of a main signal by the signal transmission apparatus 20. FIG. 9(c) illustrates spectra of the transmission signal divided (transmission division signal) and the interference signal. FIG. 9(d) illustrates band synthesis filtering by the signal reception apparatus 30. FIG. 9(e) illustrates a band-synthesized signal synthesized by the signal reception apparatus 30.

The signal transmission apparatus 20 band-divides the transmission signal by a band decomposition filter A and a band decomposition filter B so as to avoid the frequency of the interference signal estimated in advance (FIGS. 9(a) and 9(b)).

Next, the signal transmission apparatus 20 shifts the frequency of the band-divided transmission signal so that the band-divided transmission signal is not superimposed on the interference signal, and transmits the resulting signal (FIG. 9(c)).

The signal reception apparatus 30 receives the divided transmission signal and the interference signal, extracts the transmission signal from the reception signal by a band synthesis filter A and a band synthesis filter B, and performs band synthesis (FIGS. 9(d) and 9(e)).

In the first and second technologies, the divided transmission signal and the interference signal are independent from each other on a frequency axis and are not superimposed with each other. In addition, in order to reduce an effect of the interference signal, there is also a technology in which a signal transmission apparatus transmits a signal without performing band division and a signal reception apparatus attenuates an interference signal by a notch filter (hereinafter, referred to as a "third technology": see FIG. 12).

Unfortunately, there is a problem in the first technology that even if a user intends to shift a frequency in order to avoid interference, when a different user is performing communication using a target shift frequency, the intended shifting cannot be executed. FIG. 10 illustrates the problem of the first technology. FIG. 10(a) illustrates a spectrum of an interference signal. FIG. 10(b) illustrates a spectrum of a shifted transmission signal. FIG. 10(c) illustrates a problem in a reception signal. As illustrated in FIG. 10, in the first technology, when a different user is performing communication using a target shift frequency, the transmission signal and a signal of the different user are superimposed.

Furthermore, there is a problem in the second technology that a signal cannot be transmitted in a band of an interference signal to reduce the frequency utilization efficiency. FIG. 11 illustrates the problem of the second technology. FIG. 11(a) illustrates a frequency bandwidth that can be used when there is no interference signal. FIG. 11(b) illustrates a frequency bandwidth that can be used when there is an interference signal. As illustrated in FIG. 11, in the second technology, a main signal can be divided and allocated only in a band (A+C) where an interference signal band B is subtracted from an available relay band (A+B+C), for example.

Furthermore, there is a problem in the third technology that a transmission signal is shaved in the same manner as an interference signal, and a circuit quality of the transmission signal degrades significantly. FIG. 12 illustrates the problem of the third technology. FIG. 12(a) illustrates a spectrum of an interference signal. FIG. 12(b) illustrates spectra of a reception signal and the interference signal. FIG. 12(c) illustrates spectra when a notch filter is applied to the reception signal. As illustrated in FIG. 12, in the third technology, the signal reception apparatus applies a notch filter to the reception signal obtained by synthesizing a transmission signal and the interference signal, and thus the transmission signal is shaved in the same manner as the interference signal.

CITATION LIST

Non Patent Literature

Non Patent Literature 1: Jun-ichi ABE et al, "Direct Spectrum Division Transmission Adapter for Satellite Communications", 34th AIAA International Communications Satellite Systems Conference (ICSSC 2016), AIAA, 2016, 2016-5766

Non Patent Literature 2: Jun-ichi ABE, and other two persons, "Proposal of Blind Frequency Synchronization Method for Direct Spectrum Division Adapter", IEICE, Society Conference, Sep. 11-14, 2012, B-3-1, p. 268

SUMMARY OF THE INVENTION

Technical Problem

An object of the present invention is to provide a wireless communication system, a transmission apparatus, and a wireless communication method that can reduce an interference signal superimposed on a transmission signal while suppressing a decrease in frequency utilization efficiency.

Means for Solving the Problem

A wireless communication system according to an aspect of the present invention is a wireless communication system including a reception apparatus configured to receive a transmission signal, the transmission signal being decomposed into a plurality of sub-spectra and transmitted by a transmission apparatus, in which the reception apparatus includes: an interference estimation unit configured to estimate a frequency band of an interference signal in a reception signal on which the interference signal having a narrower frequency band than that of the transmission signal transmitted by the transmission apparatus is superimposed; a feedback unit configured to feed back the frequency band of the interference signal estimated by the interference estimation unit to the transmission apparatus; and a band synthesis unit configured to synthesize a plurality of sub-spectra in a frequency band corresponding to the plurality of sub-spectra decomposed by the transmission apparatus, and the transmission apparatus includes: a band division control unit configured to perform control, based on the frequency band of the interference signal fed back from the reception apparatus, for determining a band in which the transmission signal is divided, and a band division unit configured to band-divide the transmission signal into a plurality of sub-spectra, based on the band determined by the band division control unit, to superimpose the interference signal and the sub-spectra partially.

Further, in the wireless communication system according to an aspect of the present invention, the reception apparatus further includes a frequency error detection unit configured to detect a frequency error between the plurality of sub-spectra transmitted by the transmission apparatus and the plurality of sub-spectra received by the reception apparatus, the feedback unit further feeds back the frequency error detected by the frequency error detection unit to the transmission apparatus, and the band synthesis unit synthesizes the plurality of sub-spectra based on the frequency error detected by the frequency error detection unit.

Further, in the wireless communication system according to an aspect of the present invention, the band division unit band-divides the transmission signal into a plurality of sub-spectra in a frequency band including no interference signal, in addition to a frequency band including the interference signal.

Further, the wireless communication system according to an aspect of the present invention further includes a frequency error control unit configured to perform control, based on the frequency band of the interference signal estimated by the interference estimation unit and the frequency error detected by the frequency error detection unit, so that the band synthesis unit does not use a frequency error for a sub-spectrum on which the interference signal is superimposed.

Further, in the wireless communication system according to an aspect of the present invention, the band division unit performs band division to make the plurality of sub-spectra continuous on a frequency axis.

Further, a transmission apparatus according to an aspect of the present invention includes: a band division control unit configured to perform control, based on a frequency band of an interference signal having a narrower frequency band than that of the transmission signal fed back from a reception apparatus, for determining a band in which a transmission signal is divided; and a band division unit configured to band-divide the transmission signal into a plurality of sub-spectra, based on the band determined by the band division control unit, to superimpose the interference signal and the sub-spectra partially.

Further, a wireless communication method according to an aspect of the present invention is a wireless communication method in which a transmission apparatus decomposes a transmission signal into a plurality of sub-spectra and transmits the transmission signal to a reception apparatus. The method includes: an interference estimation step of estimating a frequency band of an interference signal in a reception signal on which the interference signal having a narrower frequency band than a frequency band of the transmission signal transmitted by the transmission apparatus is superimposed; a feedback step of feeding back the estimated frequency band of the interference signal to the transmission apparatus; a band division control step of performing control, based on the frequency band of the interference signal fed back from the reception apparatus, for determining a band in which the transmission signal is divided; a band division step of band-dividing the transmission signal into a plurality of sub-spectra, based on the determined band, to superimpose the interference signal and the sub-spectra partially; and a band synthesis step of synthesizing a plurality of sub-spectra in a frequency band corresponding to the plurality of sub spectra decomposed by the transmission apparatus.

The wireless communication method according to an aspect of the present invention further includes a frequency error detection step of detecting a frequency error between the plurality of sub-spectra transmitted by the transmission apparatus and the plurality of sub-spectra received by the reception apparatus, and in the feedback step, the frequency error detected in the frequency error detection step is further fed back to the transmission apparatus, and in the band synthesis step, a plurality of sub-spectra is synthesized based on the frequency error detected in the frequency error detection step.

Effects of the Invention

According to the present invention, it is possible to reduce an interference signal superimposed on a transmission signal while suppressing a decrease in frequency utilization efficiency.

DESCRIPTION OF EMBODIMENTS

Figure 1:
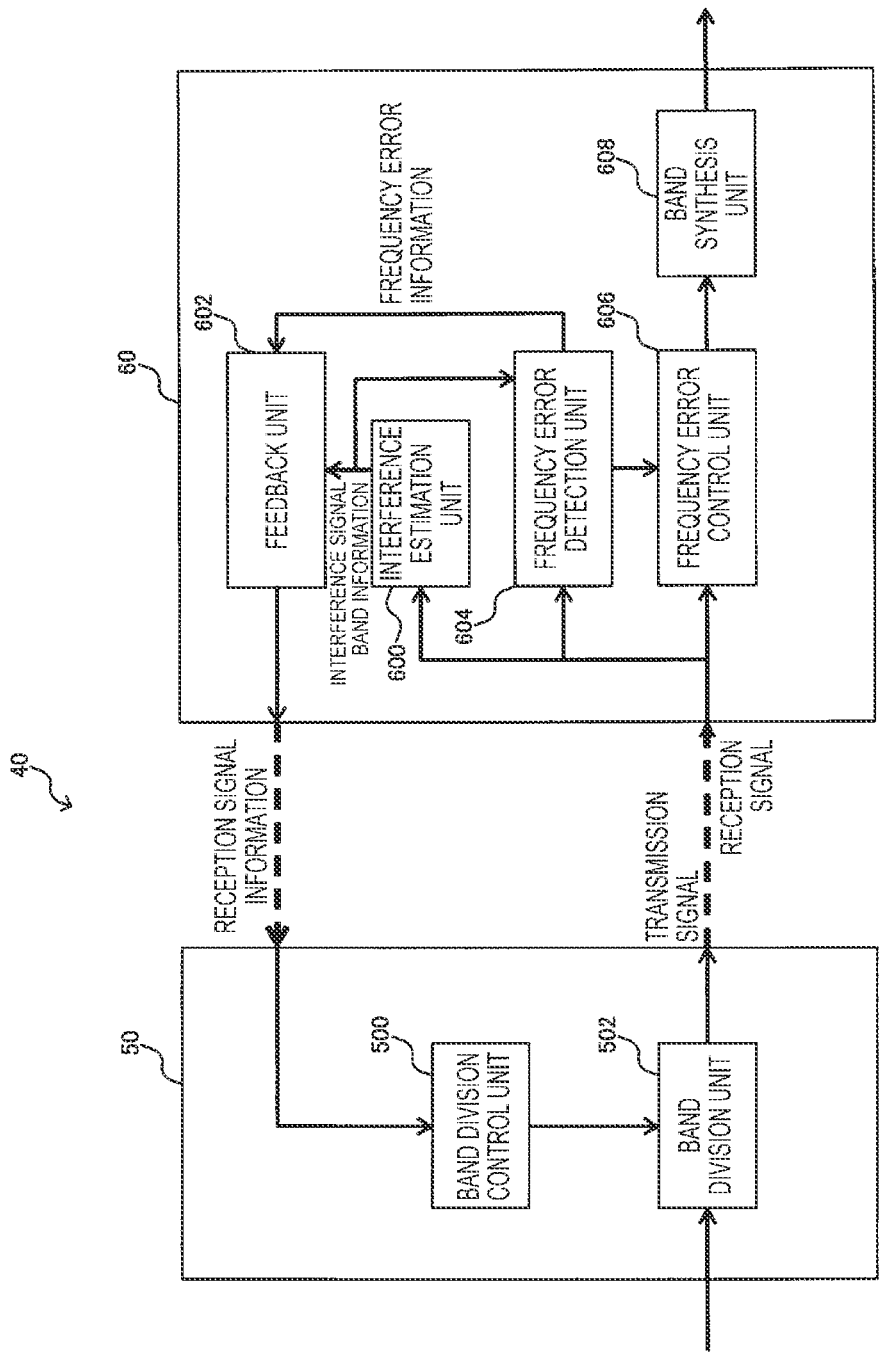
FIG. 1 is a diagram illustrating an overview of a configuration example of a wireless communication system according to an embodiment.

Hereinafter, an embodiment of a wireless communication system will be described with reference to the drawings. FIG. 1 illustrates an overview of a configuration example of a wireless communication system 40 according to the embodiment. As illustrated in FIG. 1, the wireless communication system 40 includes, for example, a signal transmission apparatus (transmission apparatus) 50 and a signal reception apparatus (reception apparatus) 60 and performs wireless communication in a communication environment in which an interference signal having a narrower frequency band than that of a transmission signal is superimposed on the transmission signal.

The signal reception apparatus 60 includes an interference estimation unit 600, a feedback unit 602, a frequency error detection unit 604, a frequency error control unit 606, and a band synthesis unit 608.

The interference estimation unit 600 estimates and identifies a frequency band (interference signal band) of an interference signal in a reception signal received by the signal reception apparatus 60. For example, the interference estimation unit 600 functions as a spectrum analyzer, and estimates and identifies the frequency band by analyzing the reception signal in a state where the signal transmission apparatus 50 temporally turns off transmission of a main signal. Then, the interference estimation unit 600 outputs interference signal band information indicating the estimated interference signal band to the feedback unit 602 and the frequency error detection unit 604.

The feedback unit 602 feeds back reception signal information including the interference signal band information indicating the interference signal band estimated by the interference estimation unit 600 and frequency error information indicating a frequency error detected by the frequency error detection unit 604, which will be described below, to the signal transmission apparatus 50.

The frequency error detection unit 604 detects a frequency difference between a plurality of received sub-spectra included in the reception signal and a plurality of transmitted sub-spectra described below as a frequency error, and outputs the frequency error information to the feedback unit 602 and the frequency error control unit 606.

The frequency error control unit 606 removes the frequency error of the plurality of received sub-spectra included in the reception signal, based on the frequency error detected by the frequency error detection unit 604. For example, the frequency error control unit 606 performs control so that the band synthesis unit 608 does not use a frequency error for a sub-spectrum on which the interference signal is superimposed, based on the frequency band of the interference signal estimated by the interference estimation unit 600 and the frequency error detected by the frequency error detection unit 604.

The band synthesis unit 608 synthesizes and outputs a plurality of received sub-spectra in which the frequency error control unit 606 has removed the frequency error using, for example, a plurality of band synthesis filters corresponding to a plurality of band decomposition filters used by the signal transmission apparatus 50.

The signal transmission apparatus 50 includes a band division control unit 500 and a band division unit 502.

The band division control unit 500 performs control for determining a band in which the transmission signal is divided, based on the reception signal information including the interference signal band information and the frequency error information fed back from the signal reception apparatus 60.

The band division unit 502 band-divides the transmission signal into a plurality of sub-spectra so that the interference signal and the sub-spectra is partially superimposed, based on the band determined by the band division control unit 500.

Next, the operation of the wireless communication system 40 will be described.

Figure 2:
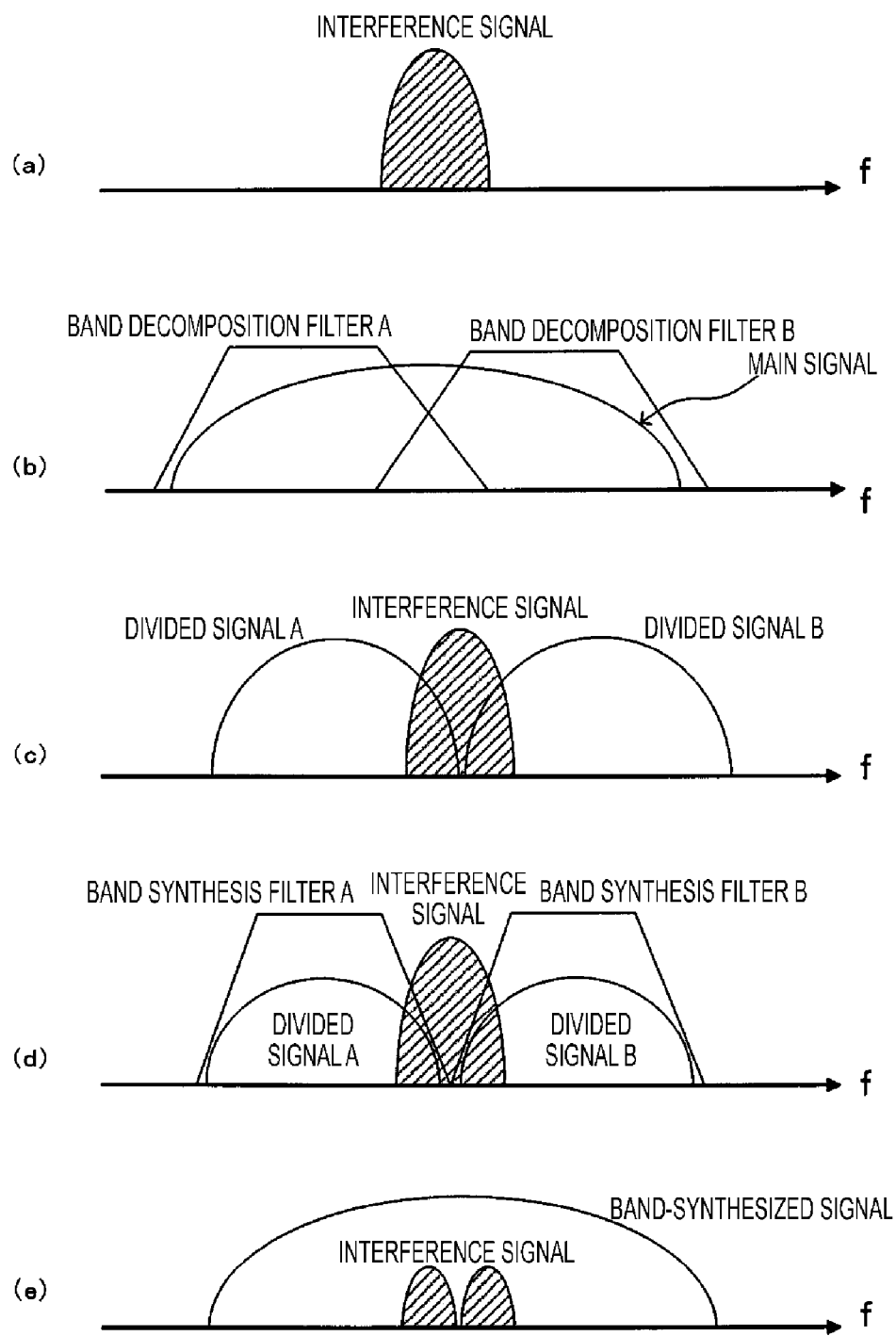
FIG. 2(a) is a diagram illustrating a spectrum of an interference signal.
FIG. 2(b) is a diagram illustrating band division of a main signal by a signal transmission apparatus.
FIG. 2(c) is a diagram illustrating spectra of the transmission signal divided and the interference signal.
FIG. 2(d) is a diagram illustrating band synthesis filtering by a signal reception apparatus.
FIG. 2(e) is a diagram illustrating a band-synthesized signal synthesized by the signal reception apparatus.

FIG. 2 illustrates an overview of a principle of operation of the wireless communication system 40 illustrated in FIG. 1. FIG. 2(a) illustrates a spectrum of an interference signal. FIG. 2(b) illustrates band division of a main signal by the signal transmission apparatus 50. FIG. 2(c) illustrates spectra of the transmission signal divided (transmission division signal) and the interference signal. FIG. 2(d) illustrates band synthesis filtering by the signal reception apparatus 60. FIG. 2(e) illustrates a band-synthesized signal synthesized by the signal reception apparatus 60.

First, in the signal reception apparatus 60, the interference estimation unit 600 estimates and identifies a frequency position of the interference signal (FIG. 2(a)).

Next, the feedback unit 602 feeds back by transmitting reception signal information including interference signal band information to the signal transmission apparatus 50.

In the signal transmission apparatus 50, the band division control unit 500 performs control so that the band division unit 502 band-divides the transmission signal into a plurality of sub-spectra based on the interference signal band information included in the reception signal information fed back from the feedback unit 602. For example, the band division unit 502 uses a band decomposition filter A and a band decomposition filter B to divide the transmission signal into a plurality of sub-spectra (FIG. 2(b)).

Here, the band division unit 502 band-divides the transmission signal so that the sub-spectra and the interference signal are partially superimposed (FIG. 2(c)). In other words, the signal transmission apparatus 50 can suppress a decrease in frequency utilization efficiency by partially superimposing the interference signal and the sub-spectra by the band division unit 502.

On the other hand, in the signal reception apparatus 60, the band synthesis unit 608 synthesizes the transmission signal that has been divided and transmitted, via the frequency error control unit 606 (FIG. 2(d)). Here, the band synthesis unit 608 partially filters the interference signal in a transition region of the band synthesis filter A and the band synthesis filter B, and thus the band synthesis unit 608 outputs the spectrum illustrated in FIG. 2(e) as a band-synthesized signal.

As illustrated in FIG. 2(e), the interference signal partially remains in the band-synthesized signal output by the band synthesis unit 608, but a maximum power portion of the interference signal is sufficiently filtered in the transition region of the band synthesis filter A and the band synthesis filter B, so that the transmission quality degradation of the transmission signal is reduced.

Alternatively, the wireless communication system 40 may be configured such that the signal transmission apparatus 50 band-divides a transmission signal so that the resulting sub-spectra are continuing on a frequency axis, and the signal reception apparatus 60 receives and synthesizes the transmission signal band-divided so that the sub-spectra are continuing, thereby further suppressing a decrease in frequency utilization efficiency.

Figure 3:
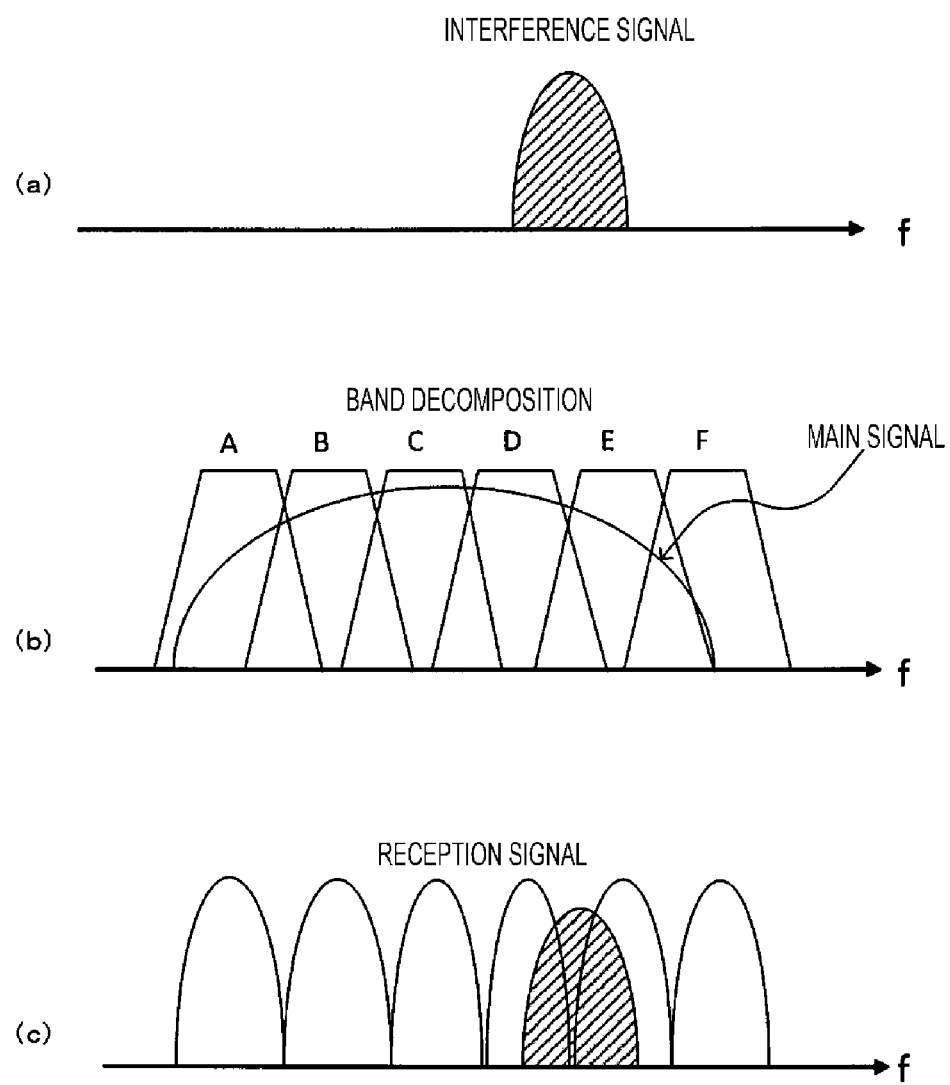
FIG. 3(a) is a diagram illustrating a spectrum of an interference signal.
FIG. 3(b) is a diagram illustrating band division of a main signal by a signal transmission apparatus.
FIG. 3(c) is a diagram illustrating spectra of the transmission signal divided and the interference signal.

FIG. 3 illustrates an example of operation of the wireless communication system 40 illustrated in FIG. 1. FIG. 3(a) illustrates a spectrum of an interference signal. FIG. 3(b) illustrates band division of a main signal by the signal transmission apparatus 50. FIG. 3(c) illustrates spectra of the transmission signal divided (transmission division signal) and the interference signal (reception signal received by the signal reception apparatus 60).

First, in the signal reception apparatus 60, the interference estimation unit 600 estimates and identifies a frequency position of the interference signal (FIG. 3(a)).

Next, the feedback unit 602 feeds back by transmitting reception signal information including interference signal band information to the signal transmission apparatus 50.

In the signal transmission apparatus 50, the band division control unit 500 performs control so that the band division unit 502 band-divides the transmission signal into a plurality of sub-spectra based on the interference signal band information included in the reception signal information fed back from the feedback unit 602. For example, the band division unit 502 uses band decomposition filters A to F to divide the transmission signal into a plurality of sub-spectra (FIG. 3(b)).

Here, the band division unit 502 band-divides the transmission signal so that sub-spectra D and E formed by the band decomposition filters D and E are partially superimposed with the interference signal (FIG. 3(c)). In other words, the signal transmission apparatus 50 can suppress a decrease in frequency utilization efficiency by partially superimposing the interference signal and the sub-spectra by the band division unit 502.

Note that the band division unit 502 purposefully performs band decomposition also in a transmission signal band that includes no interference signal. In other words, the band division unit 502 also performs band decomposition in a band in which there is no interference signal by the band decomposition filters A, B, C, and F (FIG. 3(c)).

As a reference, Non Patent Literatures 1 and 2 discloses a frequency error compensation in which a power difference between adjacent sub-spectra is utilized to ultimately compensate for a frequency error which the transmission signal receives in a frequency conversion apparatus interposed in the propagation process, on the reception side. In this case, when an interference signal is superimposed on a specific sub-spectrum, the interference signal is superimposed on the power difference between the left sub-spectrum and the right sub-spectrum, making it difficult to accurately determine the frequency error on the reception side.

In order to solve the problem, the signal reception apparatus 60 performs band division also in bands including no interference signal and mitigates an effect of the interference signal on the frequency error detected by the frequency error detection unit 604 to improve the detection accuracy of the frequency error.

As described above, the interference estimation unit 600 identifies the frequency position of the interference signal (FIG. 3(a)). Accordingly, the signal reception apparatus 60 knows in advance that the interference signal is superimposed on the reception signal synthesized by the band synthesis filter D and the band synthesis filter E corresponding to the decomposed transmission signal bands when the band synthesis unit 608 performs band synthesis. Thus, the frequency error control unit 606 does not use sub-spectra on which the interference signal is superimposed as information indicating the frequency error because there is a risk that the frequency error detection accuracy is degraded for the sub-spectra.

Specifically, the frequency error control unit 606 uses the frequency error detected by the frequency error detection unit 604 from the transition regions of the band synthesis filters A and B, the band synthesis filters B and C, the band synthesis filters C and D, and the band synthesis filters E and F each including no interference component in the frequency error, and does not use the frequency error detected from the transition region of the band synthesis filters D and E.

Figure 4:
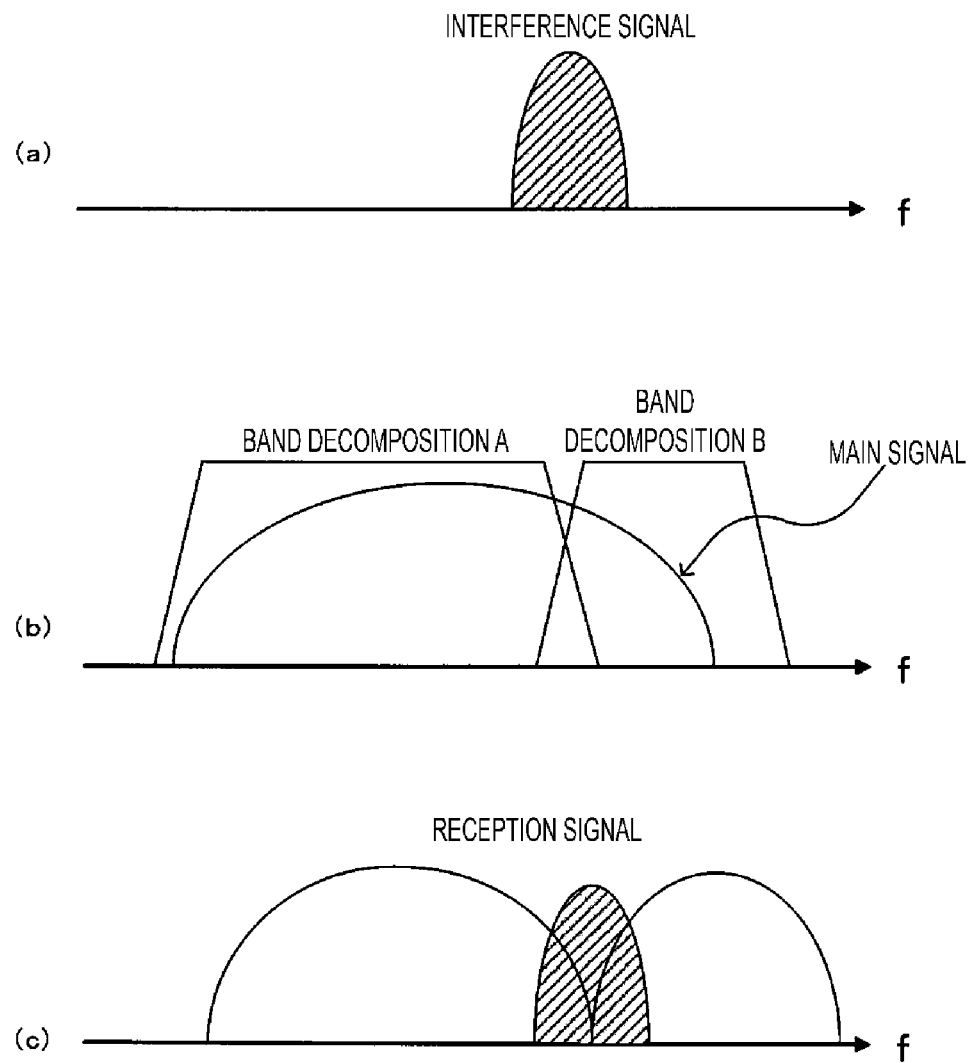
FIG. 4(a) is a diagram illustrating a spectrum of an interference signal.
FIG. 4(b) is a diagram illustrating band division of a main signal based on a frequency error by the signal transmission apparatus.
FIG. 4(c) is a diagram illustrating spectra of the transmission signal divided and the interference signal.
Figure 5:
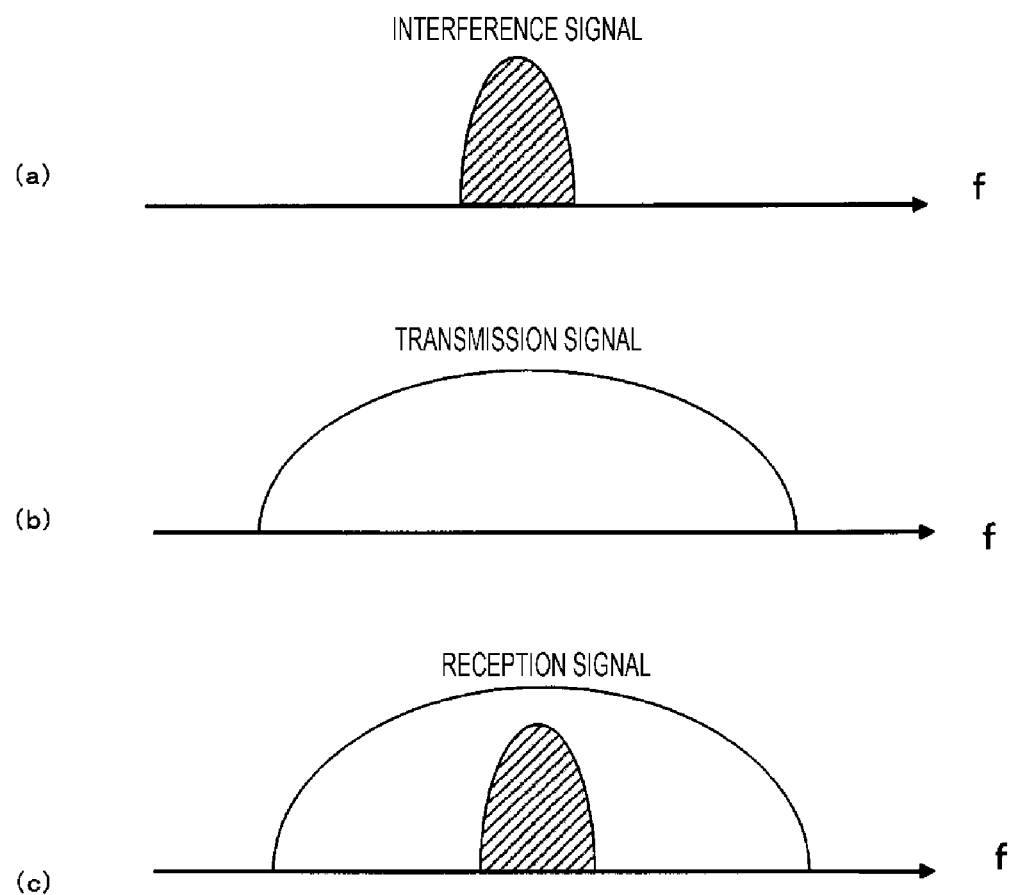
FIG. 5(a) is a diagram illustrating a spectrum of an interference signal.
FIG. 5(b) is a diagram illustrating a spectrum of a transmission signal.
FIG. 5(c) is a diagram illustrating a spectrum of a reception signal.
Figure 6:
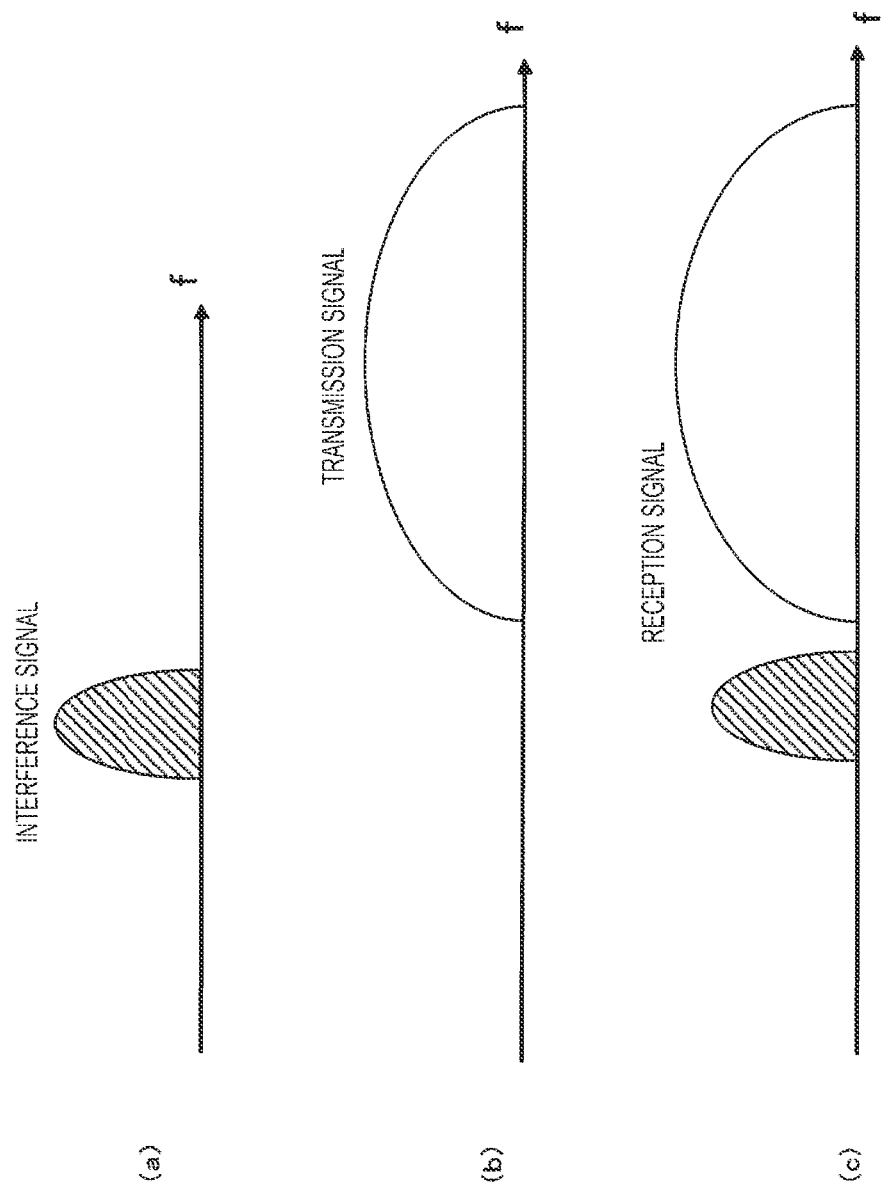
FIG. 6(a) is a diagram illustrating a spectrum of an interference signal.
FIG. 6(b) is a diagram illustrating a spectrum of a transmission signal.
FIG. 6(c) is a diagram illustrating a spectrum of a reception signal.
Figure 7:
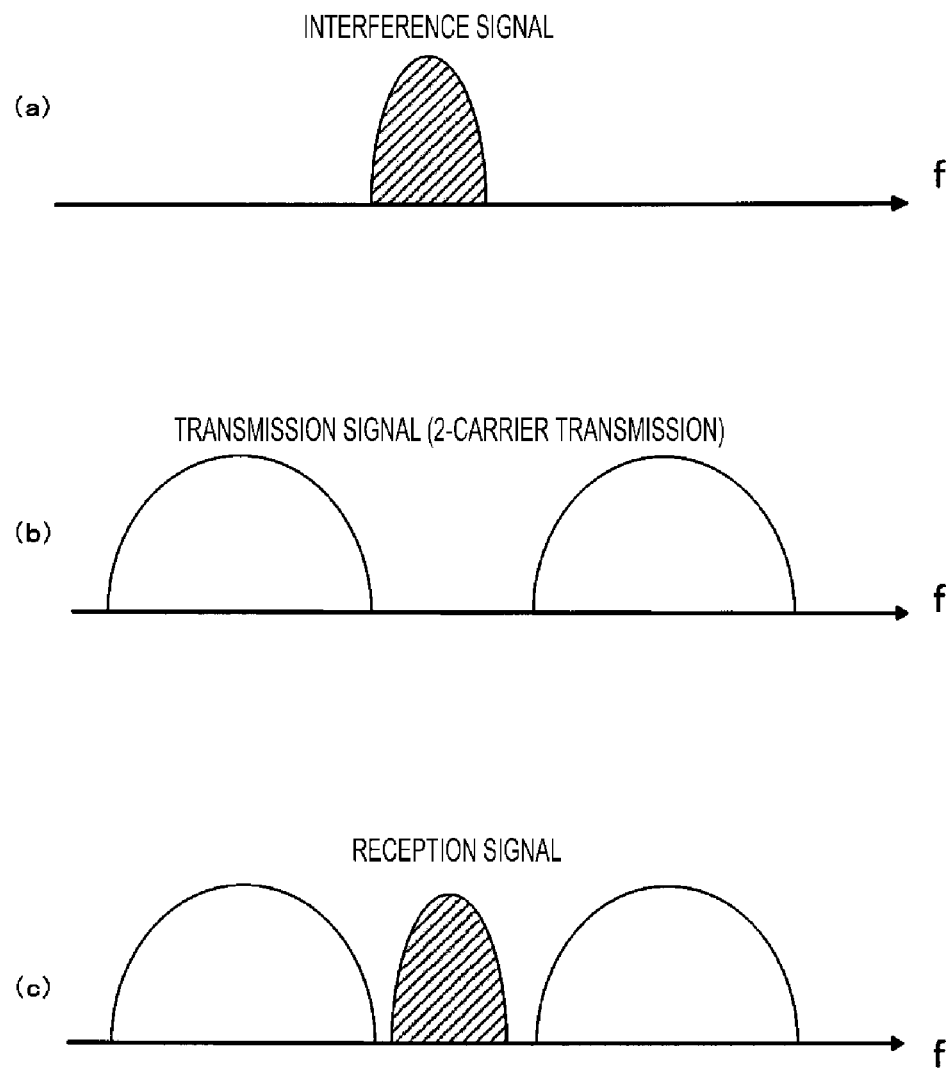
FIG. 7(a) is a diagram illustrating a spectrum of an interference signal.
FIG. 7(b) is a diagram illustrating spectra of a transmission signal.
FIG. 7(c) is a diagram illustrating spectra of a reception signal.
Figure 8:
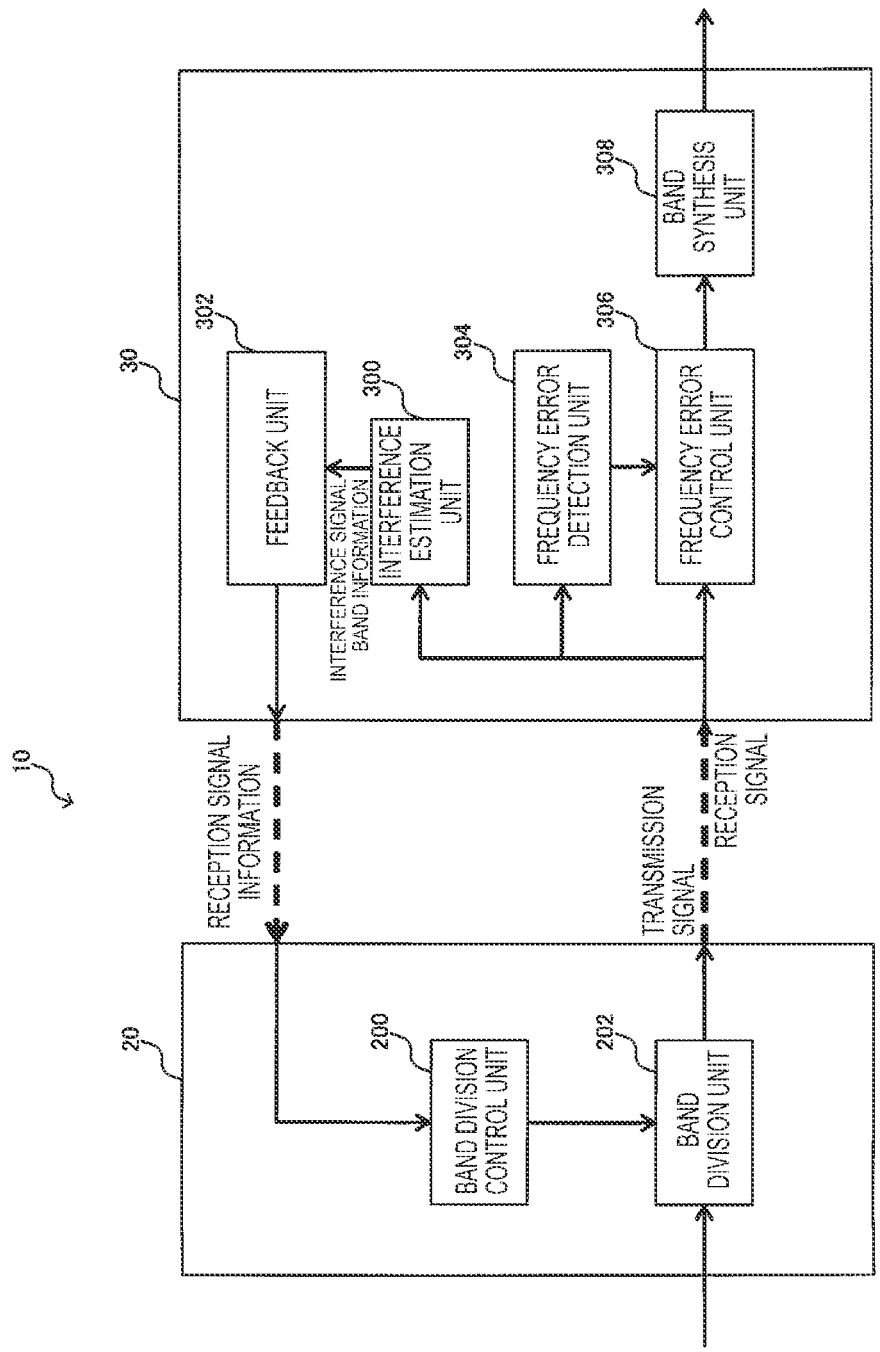
FIG. 8 is a diagram illustrating an overview of a wireless communication system implementing a second technology.
Figure 9:
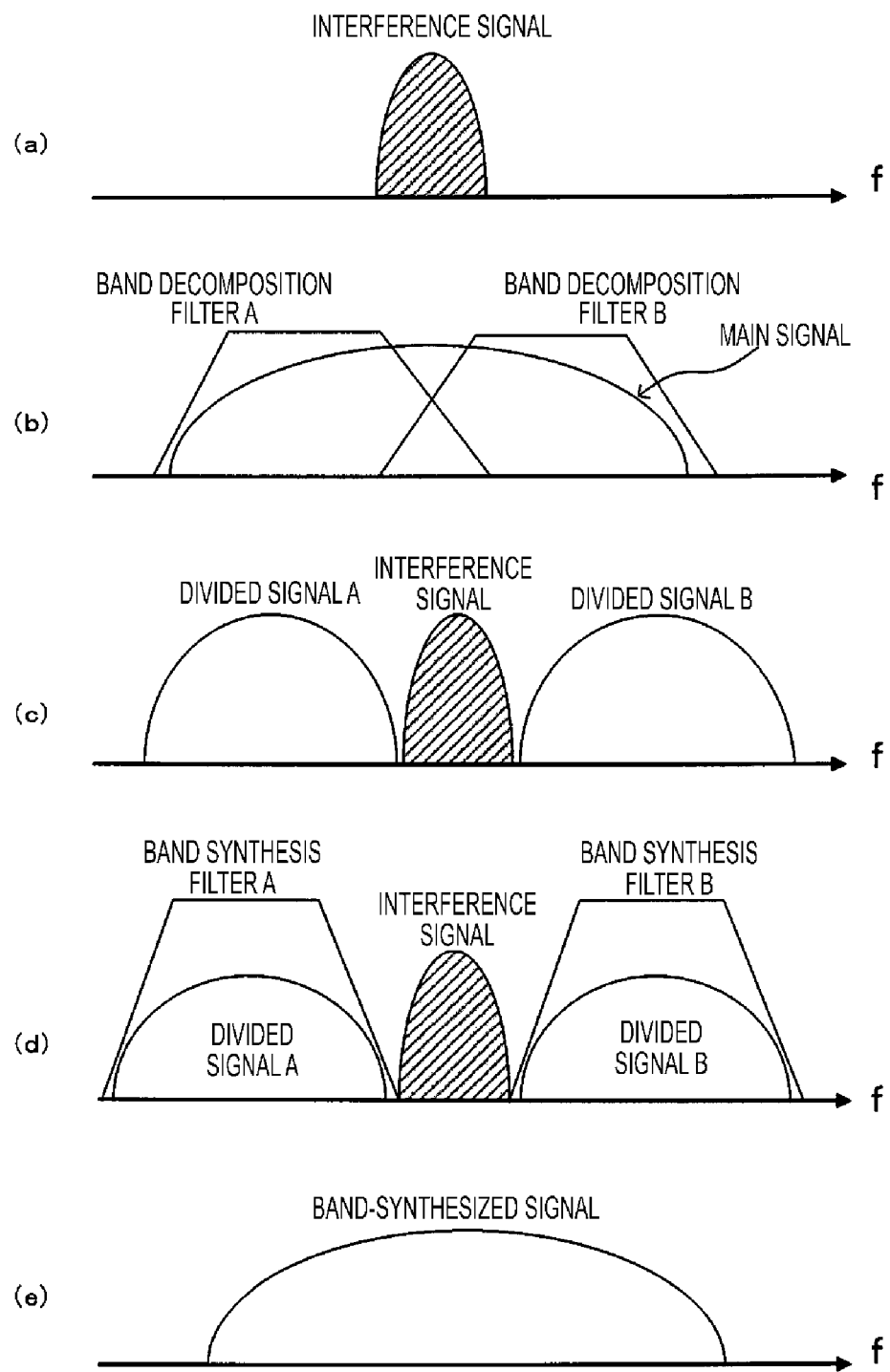
FIG. 9(a) is a diagram illustrating a spectrum of an interference signal.
FIG. 9(b) is a diagram illustrating band division of a main signal by a signal transmission apparatus.
FIG. 9(c) is a diagram illustrating spectra of a transmission signal divided and the interference signal.
FIG. 9(d) is a diagram illustrating band synthesis filtering by a signal reception apparatus.
FIG. 9(e) is a diagram illustrating a band-synthesized signal synthesized by the signal reception apparatus.
Figure 10:
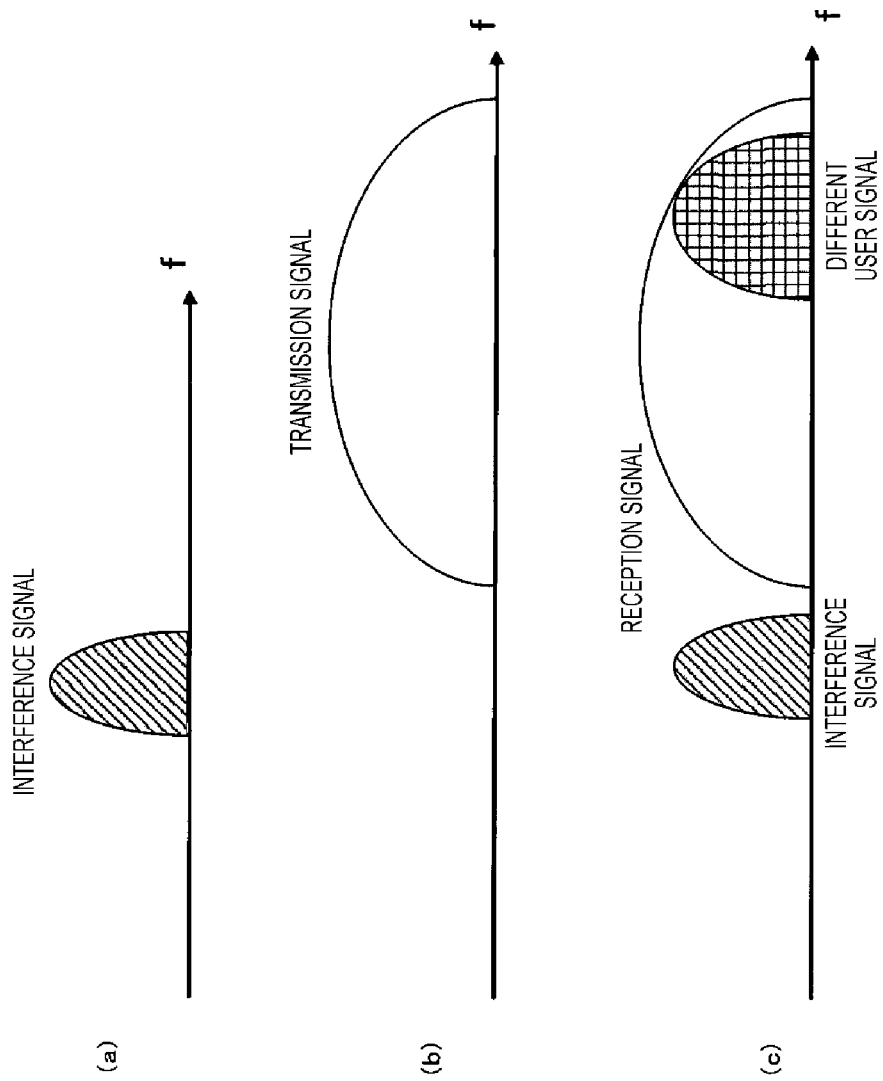
FIG. 10(a) is a diagram illustrating a spectrum of an interference signal.
FIG. 10(b) is a diagram illustrating a spectrum of a shifted transmission signal.
FIG. 10(c) is a diagram illustrating a problem in a reception signal.
Figure 11:
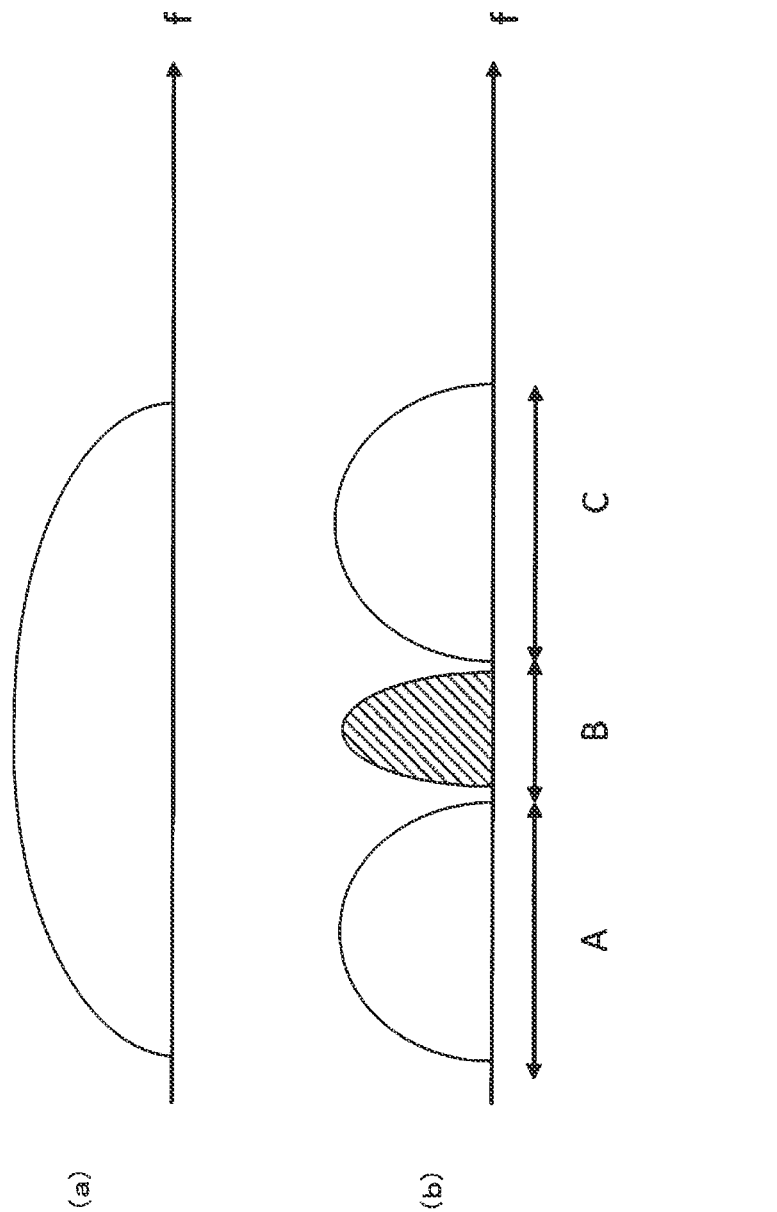
FIG. 11(a) is a diagram illustrating a frequency bandwidth that can be used when there is no interference signal.
FIG. 11(b) is a diagram illustrating a frequency bandwidth that can be used when there is an interference signal.
Figure 12:
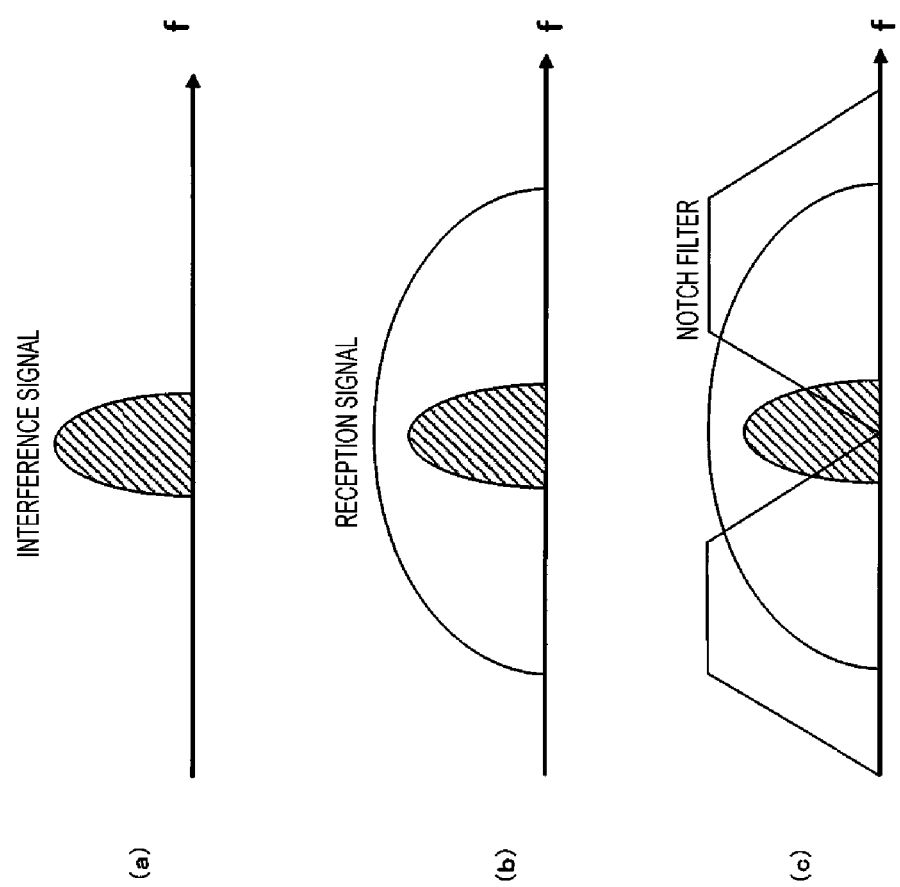
FIG. 12(a) is a diagram illustrating a spectrum of an interference signal.
FIG. 12(b) is a diagram illustrating spectra of a reception signal and the interference signal.
FIG. 12(c) is a diagram illustrating spectra when a notch filter is applied to the reception signal.

FIG. 4 illustrates a control example for a frequency error performed by the wireless communication system 40 illustrated in FIG. 1. FIG. 4(a) illustrates a spectrum of an interference signal. FIG. 4(b) illustrates band division of a main signal based on a frequency error by the signal transmission apparatus 50. FIG. 4(c) illustrates spectra of the transmission signal divided (transmission division signal) and the interference signal (reception signal received by the signal reception apparatus 60).

First, in the signal reception apparatus 60, the interference estimation unit 600 estimates and identifies a frequency position of the interference signal (FIG. 4(a)).

Next, the feedback unit 602 feeds back by transmitting reception signal information including interference signal band information and frequency error information to the signal transmission apparatus 50.

In the signal transmission apparatus 50, the band division control unit 500 performs control so that the band division unit 502 band-divides the transmission signal into a plurality of sub-spectra based on the interference signal band information and the frequency error information included in the reception signal information fed back from the feedback unit 602.

For example, the band division unit 502 uses the band decomposition filter A and the band decomposition filter B to divide the transmission signal into a plurality of sub-spectra (FIG. 4(b)).

Here, the band division unit 502 band-divides the transmission signal so that adjacent sub-spectra is partially superimposed on the interference signal (FIG. 4(c)).

In general, when a frequency error is superimposed on a transmission signal due to frequency variation or the like of an oscillator in a frequency converter of a transceiver apparatus, a frequency converter of a satellite relay, or the like, a frequency of a reception signal is shifted, and as a result, sufficient filtering cannot be performed in a transition region of band synthesis filters, and transmission quality may be degraded.

In order to prevent the degradation of transmission quality, the signal reception apparatus 60 feeds back the frequency error information of the reception signal, in addition to the interference signal band information, from the feedback unit 602 to the signal transmission apparatus 50. Specifically, in the signal transmission apparatus 50, the band division control unit 500 controls the band division unit 502 so that the band division position (frequency of the band division filter) of the transmission signal is changed by the frequency error of the reception signal.

As described above, according to the wireless communication system 40, the feedback unit 602 feeds back the reception signal information including the interference signal band information and the frequency error information to the signal transmission apparatus 50, and thus the interference signal superimposed on the transmission signal can be reduced while suppressing the decrease in frequency utilization efficiency.

REFERENCE SIGNS LIST

40 Wireless communication system
50 Signal transmission apparatus
60 Signal reception apparatus
500 Band division control unit
502 Band division unit
600 Interference estimation unit
602 Feedback unit
604 Frequency error detection unit
606 Frequency error control unit
608 Band synthesis unit

The invention claimed is:
1. A wireless communication system for satellite communication comprising:
  a receiver configured to receive a transmission signal, the transmission signal being decomposed into a plurality of sub-spectra and transmitted by a transmitter, wherein receiver is further configured to:
  estimate a frequency band of an interference signal in a reception signal on which the interference signal having a narrower frequency band than a frequency band of the transmission signal transmitted by the transmitter is superimposed;
  feed back the frequency band of the interference signal estimated to the transmitter; and
  synthesize a plurality of sub-spectra of a frequency band corresponding to the plurality of sub-spectra decomposed by the transmitter, and
  the transmitter, the transmitter configured to:
  perform control, based on the frequency band of the interference signal fed back from the receiver, for determining a band in which the transmission signal is divided; and band-divide the transmission signal into the plurality of sub-spectra, based on the band determined, to superimpose the interference signal and the sub-spectra partially.

2. The wireless communication system according to claim 1, wherein
the receiver is further configured to:
detect a frequency error between the plurality of sub-spectra transmitted by the transmitter and the plurality of sub-spectra received by the receiver,
further feeds back
the frequency error detected to the transmitter, and
synthesize the plurality of sub-spectra based on the frequency error detected.

3. The wireless communication system according to claim 2, wherein
the transmitter is configured to band-divide the transmission signal into a plurality of sub-spectra in a frequency band including no interference signal, in addition to a frequency band including the interference signal.

4. The wireless communication system according to claim 3, wherein the receiver is further configured to
perform control, based on the frequency band of the interference signal estimated and the frequency error detected, so that a frequency error for a sub-spectrum on which the interference signal is superimposed is not used.

5. The wireless communication system according to claim 1, wherein
the transmitter is configured to perform
band division to make the plurality of sub-spectra continuous on a frequency axis.

6. A transmitter for satellite communication, the transmitter configured to:
perform control, based on a frequency band of an interference signal having the frequency band narrower than a frequency band of the transmission signal fed back from a receiver, for determining a band in which a transmission signal is divided; and
band-divide the transmission signal into a plurality of sub-spectra, based on the band determined, to superimpose the interference signal and the sub-spectra partially.

7. A wireless communication method in which a transmission apparatus decomposes a transmission signal into a plurality of sub-spectra and transmits the transmission signal to a reception apparatus, the wireless communication method comprising:
an interference estimation step of estimating a frequency band of an interference signal in a reception signal on which the interference signal having a narrower frequency band than a frequency band of the transmission signal transmitted by the transmission apparatus is superimposed;
a feedback step of feeding back the estimated frequency band of the interference signal to the transmission apparatus;
a band division control step of performing control, based on the frequency band of the interference signal fed back from the reception apparatus, for determining a band in which the transmission signal is divided;
a band division step of band-dividing the transmission signal into a plurality of sub-spectra, based on the determined band, to superimpose the interference signal and the sub-spectra partially; and
a band synthesis step of synthesizing a plurality of sub-spectra in a frequency band corresponding to the plurality of sub-spectra decomposed by the transmission apparatus.

8. The wireless communication method according to claim 7, further comprising
a frequency error detection step of detecting a frequency error between the plurality of sub-spectra transmitted by the transmission apparatus and the plurality of sub-spectra received by the reception apparatus, wherein
in the feedback step,
the frequency error detected in the frequency error detection step is further fed back to the transmission apparatus, and
in the band synthesis step,
a plurality of sub-spectra is synthesized based on the frequency error detected in the frequency error detection step.

* * * * *